April 5, 1938.  F. E. WOLCOTT  2,112,944
HOLDER
Filed June 9, 1937
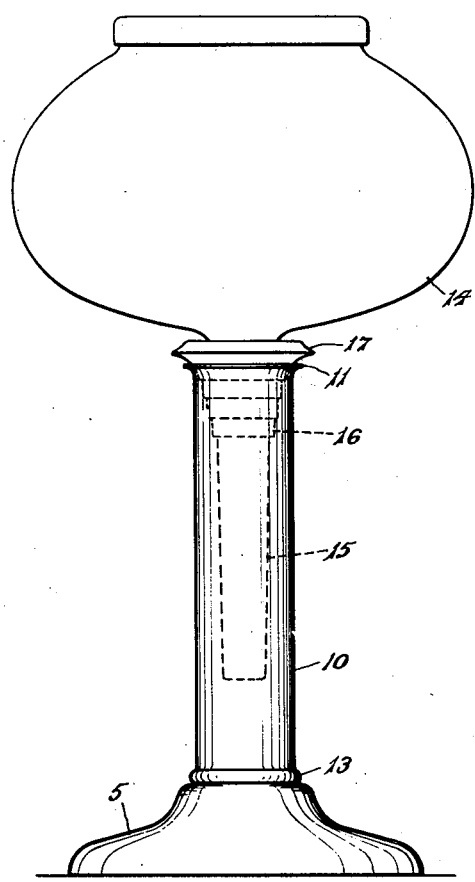
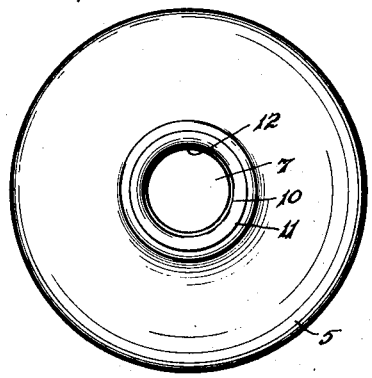
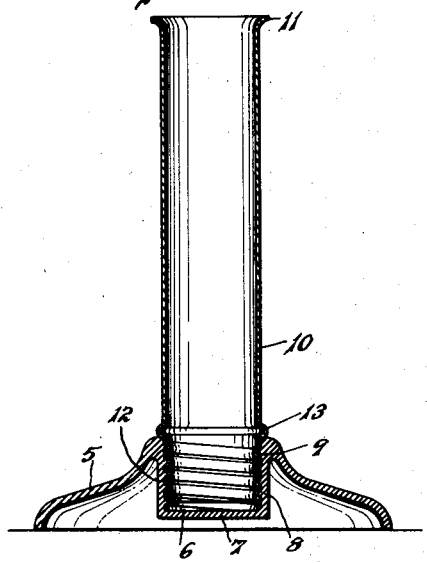
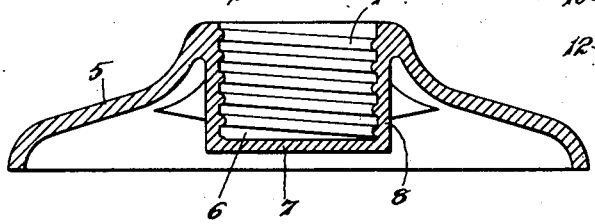
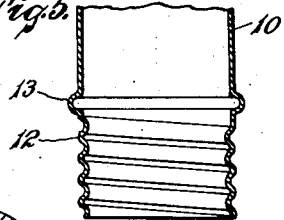
Inventor
FRANK E. WOLCOTT.
By Louis V. Lucia
Attorney Patented Apr. 5, 1938

2,112,944

UNITED STATES PATENT OFFICE 2,112,944

HOLDER

Frank E. Wolcott, West Hartford, Conn., assignor to The Silex Company, Hartford, Conn., a corporation of Connecticut Application June 9, 1937, Serial No. 147,319

3 Claims. (Cl. 65—65)

This invention relates to holders and more particularly to such holders as are especially intended for holding the upper bowls of vacuum type coffee makers.

Such coffee makers usually consist of a lower bowl on which is mounted an upper bowl having a stem extending downwardly into the said lower bowl. In the operation of making coffee in such coffee makers, water is placed in the lower bowl and finely ground coffee in the upper bowl. When heat is applied to the said lower bowl, the water therein will be forced upwardly into the upper bowl where it will become infused by the coffee grounds. The lower bowl is then allowed to cool, causing a vacuum which will draw the coffee infused water back into the said lower bowl while the coffee grounds remain in the upper bowl. The said upper bowl must then be removed from the lower bowl in order to permit serving of the coffee.

When the upper bowl is removed from the lower bowl, it is usually hot and has a certain amount of liquid still dripping from the stem thereof. It is particularly desirable, therefore, that a holder, having suitable means for catching dripping liquid, be provided to hold the hot upper bowl and catch any liquid that may drip therefrom.

Holders for such bowls have been heretofore produced but they have not been found satisfactory, for the reason that they could not be readily cleaned of any residue from the dripping liquid.

An object of this invention, therefore, is to provide an improved holder which is especially adapted for holding the upper bowls of vacuum type coffee makers by having novel drip catching means which are readily accessible for cleaning.

A further object in the provision of such a holder which, by reason of its novel construction, offers various advantages such as being convenient to use, easy to clean and attractive in appearance as well as economical to manufacture.

These and other objects of this invention, as well as advantages of the improved construction thereof, will be more clearly understood from the following description and from the accompanying drawing which illustrates one embodiment of said invention and in which:

Figure 1 is a view in side elevation of a holder comprising my invention and showing the same in use for holding an upper bowl of a coffee maker.

Figure 2 is a plan view of said holder.

Figure 3 is a side view in central vertical section thereof.

Figure 4 is an enlarged view, in central vertical section, of the base of my improved holder.

Figure 5 is a similar view of the lower portion of the holder tube.

As illustrated in the drawing, my improved holder comprises a base 5 in which is formed a well 6 having a bottom 7 and an annular wall 8 which is preferably threaded as at 9. The said base is, also preferably, constructed of a substantially thin material with the wall and base of the well 6 depending therefrom. A bottomless receptacle, in the form of a tube 10, is mounted vertically on said base and has its upper edge flared as at 11. The said tube is provided at its lower end with a threaded portion 12 which is adapted to fit within the well 6 and to engage the thread 9 on the wall thereof. A bead 13 is formed on said tube, above the portion 12 thereof, and engages the upper surface of said base around the edge of the wall 8 to securely position the tube on the base.

An upper bowl of a coffee maker is illustrated as indicated at 14. The said bowl has a stem 15 depending therefrom upon which is mounted a sealing collar 16 which is usually of tapered form and has an outwardly extending annular flange 17 of a diameter larger than that of the tube 10 at its edge 11.

In the use of my improved holder, the stem 15 of the upper bowl is inserted within the receptacle tube 10 and the said bowl is supported by means of the flange 17, on the collar 16, which will rest upon the upper edge 11 of the tube, thus supporting the bowl squarely on said holder with the stem 15 and a portion of the collar 16 depending downwardly within the receptacle tube.

Any liquid remaining in said bowl will drip out from the bottom of the stem 15 through the tube 10 and into the well 6 in the base. When it is desired to clean the interior of my improved holder of any residue from said liquid, the receptacle tube 10 may be quickly removed from the base, by unscrewing the stem therefrom, thus rendering the interiors of the well 6 and the tube 10 readily accessible so that they may be easily and thoroughly cleaned out.

I claim:

1. A holder for the upper bowl of a coffee maker and comprising a base having a bottomed recess forming a well therein, and a bottomless tube in contact with the walls of said well and extending upwardly therefrom.

2. A holder of the character described comprising a base having a well therein with an annular threaded wall, a bottomless tubular member having a threaded end portion adapted to be inserted into said well and to fit in engagement with the said threaded wall, and an outwardly extending bead on said member forming a stop for limiting the distance for which the said member is inserted into said well.

3. A holder for the upper bowl of a coffee maker and comprising a base having a bottomed recess forming a well therein; and a bottomless tube in contact with the walls of said well and extending upwardly therefrom; the said tube having the top edge thereof flared outwardly.

FRANK E. WOLCOTT.